No. 788,049. PATENTED APR. 25, 1905.
C. W. JOHNSON.
RECIPROCATING DEVICE FOR BRUSHES.
APPLICATION FILED AUG. 4, 1903.
3 SHEETS—SHEET 1.
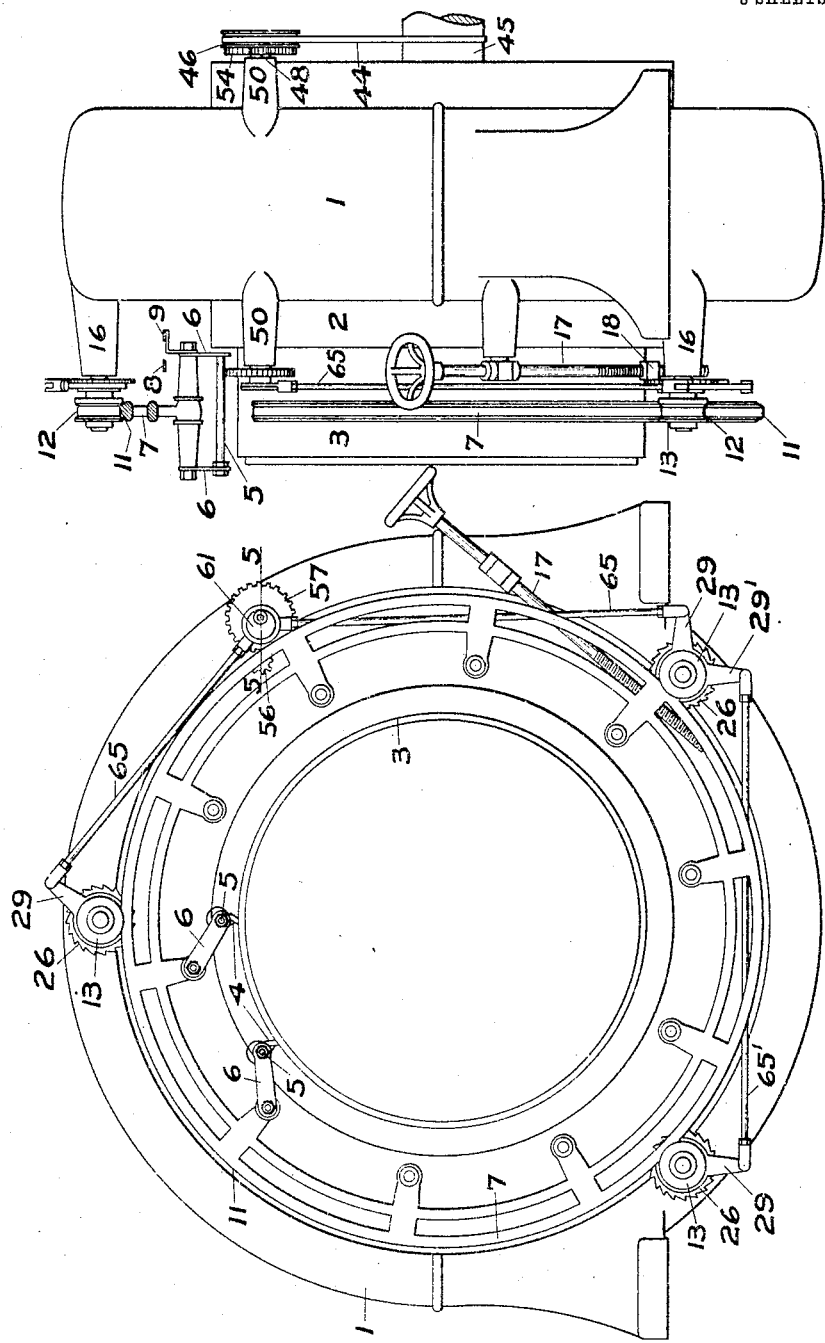
WITNESSES:
INVENTOR
Charles W. Johnson
BY
ATTORNEY No. 788,049. PATENTED APR. 25, 1905.
C. W. JOHNSON.
RECIPROCATING DEVICE FOR BRUSHES.
APPLICATION FILED AUG. 4, 1903.
3 SHEETS—SHEET 2.
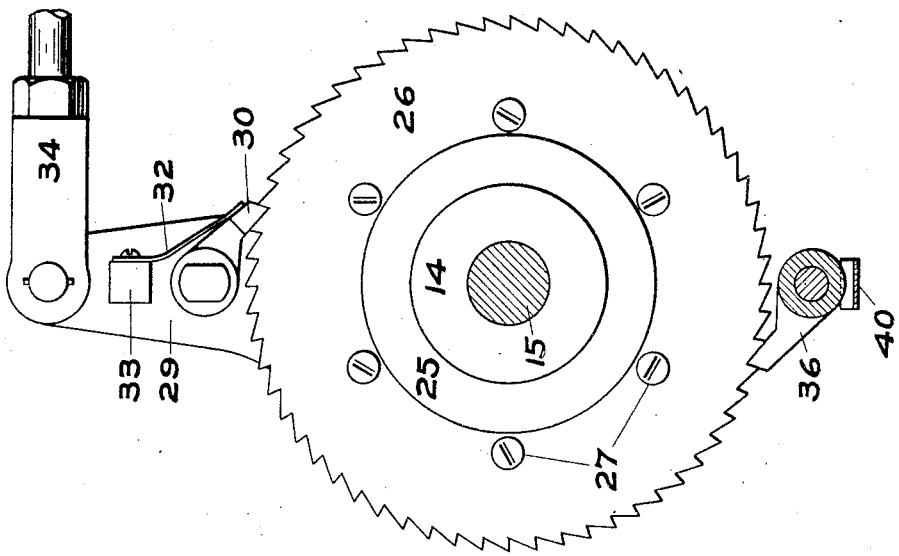
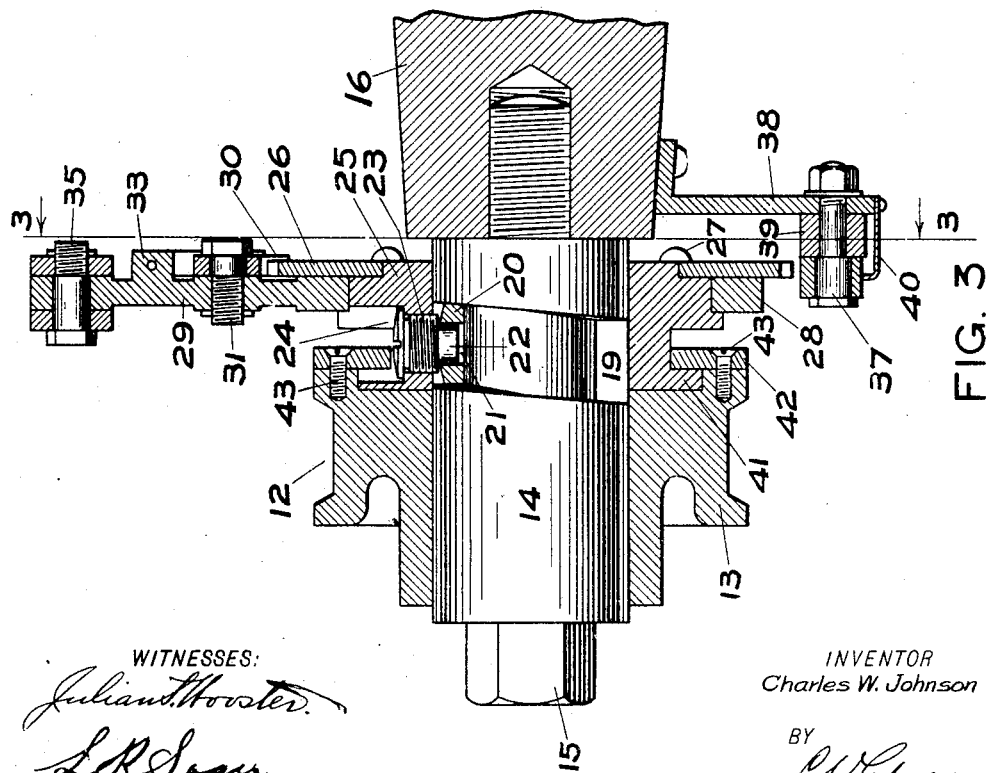
WITNESSES:
Julian T. Wooster
L. R. Sager
INVENTOR
Charles W. Johnson
BY
C. W. Edwards
ATTORNEY

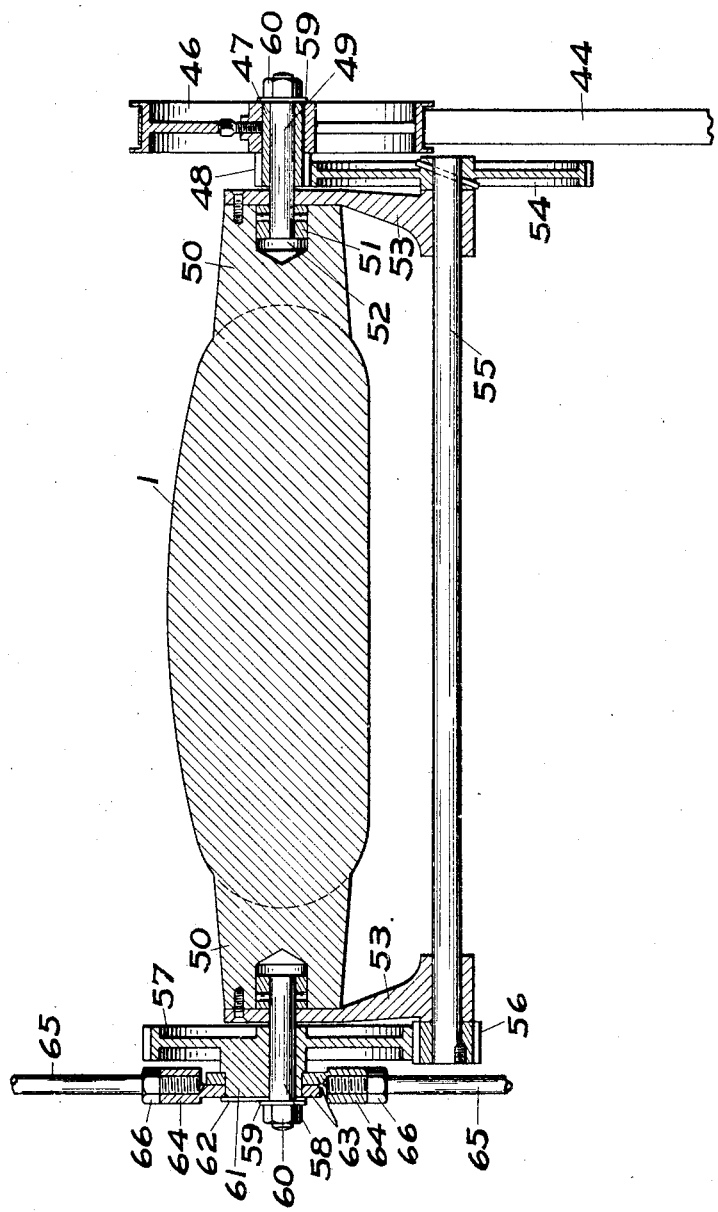

No. 788,049. Patented April 25, 1905.

UNITED STATES PATENT OFFICE.

CHARLES W. JOHNSON, OF NORWOOD, OHIO, ASSIGNOR, BY MESNE ASSIGNMENTS, TO THE BULLOCK ELECTRIC COMPANY, A CORPORATION OF OHIO.

RECIPROCATING DEVICE FOR BRUSHES.

SPECIFICATION forming part of Letters Patent No. 788,049, dated April 25, 1905.

Application filed August 4, 1903. Serial No. 168,135.

*To all whom it may concern:*

Be it known that I, CHARLES W. JOHNSON, a citizen of the United States, residing at Norwood, in the county of Hamilton and State of Ohio, have invented certain new and useful Improvements in Reciprocating Devices for Brushes, of which the following is a full, clear, and exact specification.

My invention relates to dynamo-electric machines and to means for reciprocating the brushes in the direction of the axis of the rotating part of the machine, which reciprocation is continuous while the machine is in operation. When the brushes are fixed in position and the machine operated for a considerable length of time, the wear of the brushes upon the commutator or collecting-rings, as the case may be, causes grooves to be formed thereon and a very uneven surface, so that the amount of surface contact between the brushes and commutator or rings becomes very much reduced. This poor surface contact not only causes sparking, with its disastrous effects, but greatly increases the friction, and after the contacting parts have become uneven to a slight degree the tendency to further grooving and roughness is greatly increased. This difficulty is overcome by my invention, and there is a continual change of contacting surfaces caused by an axial movement given to the brushes.

In my construction I support all the brushes on a single brush-yoke and provide means for giving the yoke, and consequently the brushes, a slow reciprocating movement.

My invention particularly relates to means for producing movement of the brush-yoke, and for this purpose I mount the same on rollers carried by arms projecting from the main frame of the machine, the said rollers being given an axial movement and deriving their motion from an intermittent clutch device operated from the driving-shaft.

My invention will be better understood from the following specification and the annexed drawings, which show the preferred form of construction, and the novel features thereof will be particularly pointed out in the claims.

Figure 1 is an end view of a machine having my improvement applied thereto, some parts of the machine not being shown for clearness. Fig. 2 is a side view with part of the brush-yoke broken away. Fig. 3 is a sectional view through one of the rollers which support the brush-yoke. Fig. 4 is a section on the line 3 3 of Fig. 3. Fig. 5 is a sectional view on the line 5 5 of Fig. 1.

The frame 1 of the machine has within it the rotating part 2 and commutator 3, as is customary, the brushes 4 bearing thereon, and although only two sets of brushes are indicated in Fig. 1 it will be understood that each arm of the brush-yoke carries a set of brushes. The brushes are carried by rods 5, supported by side pieces 6, suitably secured to and insulated from the brush-yoke 7. Alternate sets of brushes are connected to the positive and negative brush-rings 8 9. The brush-yoke is provided with a periphery 11, adapted to engage the grooves 12 of the rollers 13. The rollers are mounted on fixed sleeves 14, secured by the bolts 15 to the arms 16, extending from the frame 1. The rollers 13, (three of which are shown,) thus form a support for the brush-yoke which may be shifted for the purpose of adjusting the brushes to the proper position by the screw 17, which engages the nut 18, secured to the brush-yoke. The construction of the three supports is shown in Figs. 3 and 4. Each of the sleeves 14 has a closed inclined groove 19, and a follower 20 travels therein. The follower has an opening 21, into which projects the end 22 of a screw 23. This screw is inserted through a pocket 24 and screwed into the collar 25, loosely mounted on the sleeve 14. The ratchet-wheel 26 is secured to the collar 25 by the screws 27. Mounted loosely upon the collar 25 is a strap 28, having the arm 29 extending therefrom. The pawl 30 is carried by the bolt 31, secured to the arm 29. A spring 32, carried by the stud 33 on the arm, maintains the pawl in engagement with the ratchet-wheel 26. An oscillating motion is given to the arm 29 by the reciprocating member 34, which embraces the upper end of the arm and is secured thereto by the bolt 35. A pawl 36 also engages the ratchet-wheel to prevent backward movement of the same. This pawl is carried on a stud 37, secured to the support 38 and spaced therefrom by the bushing 39. A spring 40, secured to the end of the support 38, engages a flat portion of the pawl and so keeps the same in engagement with the ratchet-wheel. It is evident that rotation of the ratchet-wheel and collar 25 will cause an axial movement of the same, as well as parts carried thereby, by reason of the follower 20 passing in the inclined groove 19. The collar 25 has flange 41, which engages a recess in the roller 13, this flange being also surrounded by a retaining-plate 42, secured to the roller 13 by the screws 43. The axial movement of the collar 25 is therefore imparted to the roller 13, the flange 41 rotating within the recess in the roller.

Evidently any of the various forms of intermittent clutch devices may be used in place of the pawl-and-ratchet mechanism.

A reciprocating movement of the arms 29 is obtained in the following manner: On the side of the frame 1 opposite to that on which the brushes are located a strap 44 engages the main shaft 45 and a pulley 46, fixed to the sleeve 47, carrying the pinion 48. The sleeve 47 is mounted on a stud 49, which is supported by the collar 51 in the end of the arm 50, extending from frame 1. This collar is retained within the recess 52 by the support 53, secured to the arm 50. The pinion 48 meshes with gear 54, fixed to the shaft 55, which passes within the main frame 1 and supported in two similar frames 53, each secured to arms 50. The shaft 55 carries the pinion 56 at one end, which meshes with gear 57, mounted on the stud 58, supported in one of the arms 50 in a manner similar to that of stud 49. The members carried by the studs 49 and 58 are retained thereon by washers 59 and nuts 60. The gear 57 has formed integral therewith the eccentric-hub 61, and retained thereon by the washer 62 are the straps 63, each carrying lugs 64, which are tapped to receive the threaded rods 65, having the lock-nuts 66. The opposite ends of the rods 65 are also threaded and engage the lugs 34, which operate the arms 29. As shown in Fig. 1, a threaded rod 65' extends from an additional arm 29' on the strap 28 to the lower left-hand roller-support. In the same way the oscillating movement could be imparted to any number of roller-supports necessary for large machines.

The operation of my device is as follows: The rotation of the main shaft imparts motion to belt 44 and pulley 46 through the gearing 48, 54, 56, and 57, and the eccentric 61. The rods 65 receive the reciprocating motion from the eccentric, and the arms 29 therefore oscillate about their axes, giving rotation to the ratchet-wheels and followers 20 in the inclined grooves 19, which give an axial movement to the rollers 13, as above explained. The brush-yoke is therefore given a reciprocating axial motion, and the position of the brushes on the commutator is consequently continually changing. Evidently the amount of inclination of the groove 19 will determine the axial movement of the brushes.

I claim as my invention—

1. In a device for imparting reciprocating motion to the brushes of a dynamo-electric machine the combination of a brush-yoke, roller-supports therefor, and means for imparting axial movement to said supports.

2. In a device for imparting reciprocating motion to the brushes of a dynamo-electric machine the combination of a brush-yoke, supports therefor, and means for imparting an intermittent axial movement in each direction to said supports.

3. In a device for imparting reciprocal motion to the brushes of a dynamo-electric machine the combination of a brush-yoke, supports therefor, and means comprising an intermittent clutch device for imparting axial movement to said supports.

4. In a device for imparting reciprocating motion to the brushes of a dynamo-electric machine the combination of an eccentric, means for driving said eccentric, rods driven by said eccentric, intermittent clutch devices operated by said rods and means operated by each of said clutch devices for imparting axial movement to the brushes.

5. In a device for imparting reciprocating motion to the brushes of a dynamo-electric machine the combination of an eccentric, means for driving said eccentric from the main shaft of the machine, rods driven by said eccentric, intermittent clutch devices operated by said rods and means operated by each of said clutch devices for imparting axial movement to the brushes.

6. In a device for imparting axial movement to the brushes of a dynamo-electric machine the combination of an eccentric, gearing for driving said eccentric from the main shaft of the machine, rods driven by said eccentric, intermittent clutch devices operated by said rods and means operated by each of said clutch devices for imparting axial movement to the brushes.

7. In a device for imparting axial movement to the brushes of a dynamo-electric machine the combination of gearing driven from the main shaft of the machine, an eccentric operated by said gearing, rods driven by said eccentric, a pawl and ratchet driven by each rod and means operated by each of said ratchets for imparting axial movement to the brushes.

8. In a device for imparting axial movement to the brushes of a dynamo-electric machine the combination of gearing driven from the main shaft of the machine, an eccentric operated by said gearing, rods driven by said eccentric, a pawl and ratchet driven by each rod, a collar secured to each of said ratchets, each of said collars having a roller connected thereto and a follower engaging an inclined groove in a fixed support, the rollers forming a support for the brush-yoke.

9. In a device for imparting axial movement to the brushes of a dynamo-electric machine the combination of a brush-yoke, having its periphery engaged by rollers, fixed sleeve-supports for said rollers, said supports having inclined grooves, collars mounted on said supports and each carrying a follower engaging said inclined grooves, said collars being connected to said rollers, and an intermittent clutch device operated from the main shaft of the machine for imparting rotation to said collars.

10. In a device for imparting axial movement to the brushes of a dynamo-electric machine the combination of a brush-yoke, having its periphery engaged by rollers, fixed sleeve-supports for said rollers, said supports having inclined grooves, collars mounted on said supports and each carrying a follower engaging said inclined grooves, said collars being connected to said rollers, and pawl-and-ratchet mechanisms operated from the main shaft of the machine for imparting rotation to said collars.

11. In a device for imparting axial movement to the brushes of a dynamo-electric machine the combination of a brush-yoke, having its periphery engaged by rollers, fixed sleeve-supports for said rollers, said supports having inclined grooves, collars mounted on said supports and each carrying a follower engaging said inclined grooves, said collars being connected to said rollers, pawl-and-ratchet mechanisms, rods connected to the pawl-carrying members and an eccentric for imparting reciprocating motion to said rods, said eccentric being operated from the main shaft of the machine.

12. In a device for imparting axial movement to the brushes of a dynamo-electric machine the combination of a brush-yoke, having its periphery engaged by rollers, fixed sleeve-supports for said rollers, said supports having inclined grooves, collars mounted on said supports and each carrying a follower engaging said inclined grooves, said collars being connected to said rollers, pawl-and-ratchet mechanisms, rods connected to the pawl-carrying members, an eccentric for imparting reciprocating motion to said rods and gearing for operating said eccentric from the main shaft of the machine.

13. In a device for imparting axial movement to the brushes of a dynamo-electric machine the combination of a brush-yoke, having its periphery engaged by rollers, fixed sleeve-supports for said rollers, said supports having inclined grooves, collars mounted on said supports and each carrying a follower engaging said inclined grooves, said collars being connected to said rollers, pawl-and-ratchet mechanisms, rods connected to the pawl-carrying members, an eccentric for imparting reciprocating motion to said rods, gearing for operating said eccentric from the main shaft of the machine, said gearing comprising a belt around the main shaft, a pulley operated thereby and gears between said pulley and eccentric.

14. In a device for imparting axial movement to the brushes of a dynamo-electric machine the combination of a brush-yoke, having its periphery engaged by rollers, fixed sleeve-supports for said rollers, said supports having inclined grooves, collars mounted on said supports and each carrying a follower engaging said inclined grooves, said collars being connected to said rollers, pawl-and-ratchet mechanisms, rods connected to pawl-carrying members, an eccentric for imparting reciprocating motion to the rods, and gearing comprising a belt around the main shaft, a pulley operated thereby, gearing driven by said pulley and a driving-shaft extending to the opposite side of the machine and gearing connected to said shaft for operating said eccentric.

In testimony whereof I affix my signature in presence of two witnesses.

CHARLES W. JOHNSON.

Witnesses:
L. K. SAGER,
SANFORD KLEIN.